United States Patent [19]

Bruning

[11] Patent Number: 5,449,116
[45] Date of Patent: Sep. 12, 1995

[54] TIE PLATE FOR MOUNTING RAILS

[76] Inventor: Donald D. Bruning, 7137 Carter Trail, Boulder, Colo. 80301

[21] Appl. No.: 296,622

[22] Filed: Aug. 26, 1994

Related U.S. Application Data

[60] Continuation of Ser. No. 134,136, Oct. 8, 1993, abandoned, which is a continuation-in-part of Ser. No. 893,614, Jun. 5, 1992, Pat. No. 5,251,732, which is a continuation-in-part of Ser. No. 760,658, Sep. 16, 1991, Pat. No. 5,154,346, which is a division of Ser. No. 569,104, Aug. 17, 1990, Pat. No. 5,120,910.

[51] Int. Cl.$^6$ .................................................. E01B 9/40
[52] U.S. Cl. ........................................ 238/295; 238/287; 238/10 E
[58] Field of Search .............. 238/10 E, 294, 295, 238/297, 298, 287, 366, 372, 304, 308, 290

[56] References Cited

U.S. PATENT DOCUMENTS

| | | | |
|---|---|---|---|
| 262,404 | 8/1882 | Gray | 238/372 X |
| 1,174,638 | 3/1916 | Taylor | 238/290 |
| 1,194,047 | 8/1916 | Lynch | 238/372 X |
| 1,358,529 | 11/1920 | Davis | 238/295 |
| 2,435,390 | 2/1948 | Grover | 238/10 E X |
| 2,777,641 | 1/1957 | Snyder | 238/366 |
| 2,905,390 | 9/1959 | Saul | 238/294 X |
| 4,155,507 | 5/1979 | Chierici et al. | 238/287 |

FOREIGN PATENT DOCUMENTS

| | | | |
|---|---|---|---|
| 133183 | 12/1932 | Austria | 238/366 |
| 3039412 | 10/1980 | Germany . | |

*Primary Examiner*—Michael S. Huppert
*Assistant Examiner*—James Eller
*Attorney, Agent, or Firm*—Homer L. Knearl

[57] ABSTRACT

A tie plate with posts is designed for easy insertion of the foot of the rail cooperates with pins through the posts to rigidly affix the rail to the tie plate and to railroad ties or roadbed. The posts may be made of flexible material in which case the rails are snapped into the tie plate. Alternatively the posts may be fabricated from hard plastics, ceramics, or metals, in which case the rails slide into the tie plates. The posts restrain the rail from lifting out of the tie plate or shifting laterally in the tie plate. Pins with fluted, or otherwise textured, surfaces are driven through guiding holes in the posts of the tie plate past the edge of the foot of the rail. The fluted edges of the pin serve to grip the rail. The pins are made of rigid or hard materials so that the pin will provide rigidity to the posts and also slightly deform the edge of the foot of the rail and thereby grip or engage the foot.

4 Claims, 3 Drawing Sheets

TIE PLATE FOR MOUNTING RAILS

CROSS REFERENCE TO RELATED PATENTS

This application is a continuation of application Ser. No. 08/134,136, filed Oct. 8, 1993, now abandoned, which is a Continuation-In-Part of patent application Ser. No. 07/893,614 filed Jun. 5, 1992 and entitled "Support Rail for Composite Continuous Rail" now U.S. Pat. 5,251,732, issued on Oct. 12, 1993, which is a Continuation-In-Part of patent application Ser. No. 07/760,658 filed Sep. 16, 1991, now U.S. Pat. 5,154,346, issued on Oct. 13, 1992 and entitled "Rail Mounting Clip for Railroad," which is a Division of patent application Ser. No. 07/569,104 filed Aug. 17, 1990, now U.S. Pat. No. 5,120,910 issued on Jun. 9, 1992 and entitled "Minimum-Joint Electrified Rail System."

FIELD OF THE INVENTION

This invention relates to tie plates for mounting rails of a railroad on railroad ties or roadbed. More particularly, the invention relates to tie plates designed for quick mounting of rails on ties or roadbed.

DESCRIPTION OF THE PRIOR ART

Tie plates have been designed with flexible posts so that conventional "I" shaped rails with a head and a foot will snap into the tie plate. The posts are flexed apart to receive the foot of the rail and snap over the foot of the rail to hold the rail in the tie plate. Exemplary of this design is the tie plate in German Patent DE 3039412.

A problem with the flexible posts is their flexibility in that once the rail is mounted in the tie plate the flexibility permits the rail to move around in the tie plate.

SUMMARY OF THE INVENTION

It is an object of this invention to provide a tie plate in which a rail may be easily mounted and, thereafter, rigidly affixed to the tie or roadbed.

In accordance with this invention, the above object is accomplished by providing a tie plate with posts for easy insertion of the foot of the rail, and with pins cooperating with the posts to rigidly affix the rail to the tie plate and ties or roadbed. The posts are made of flexible material, and, the rails are snapped into the tie plate. Flexible posts on the tie plate have sufficient flex that the foot of a rail, when pressed down on top of the posts, will spread the posts until the foot snaps past the posts against the base plate portion of the tie plate. The posts then restrain the rail from lifting out of the tie plate or shifting laterally in the tie plate.

Pins with fluted, or otherwise textured, surfaces are driven through guiding holes in the posts of the tie plate past the edge of the foot of the rail. The fluted edges of the pin serve to grip the rail. The pins are made of rigid, or hard, materials so that the pin will slightly deform the edge of the foot of the rail and thereby grip, or engage, the foot. The pins would be fabricated from steel, nickel, brass, aluminum or alloys of same.

Also, the pins serve to provide rigidity for the posts, as well as gripping the edge of the foot of the rail. The pins may be driven through the base of the tie plate into ties, or roadbed, to hold the rail rigidly on the ties or roadbed.

Other features, objects, and advantages of the invention will be understood by those of ordinary skill in the art after referring to the complete written description of the preferred embodiment in conjunction with the following drawings.

DETAILED DESCRIPTION OF THE INVENTION

Figure 1A:
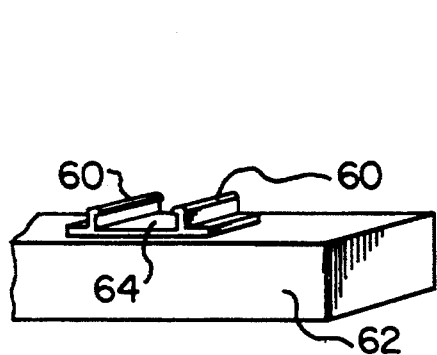
FIG. 1A shows a spring-loaded clip for mounting the support rail on interconnecting ties.

FIG. 1A illustrates a clip 64 for holding the rail to a railroad tie 62. Alternatively, the clip could hold the rail directly to the roadbed. Clip 64 has spring tension arms 60. A support rail may be snapped into the clip between the arms 64, as shown in FIG. 1B, and be held by the clip on tie 62 or a roadbed (not shown).

Figure 1B:
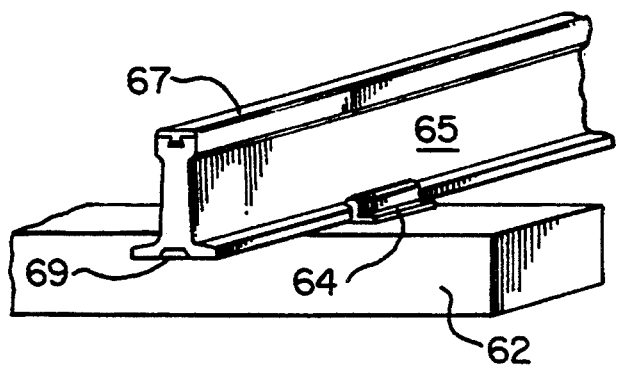
FIG. 1B shows a support rail with a conductive surface rail and a second strip which is conductive, the surface rail for providing power to the vehicle and second strip for providing control signals.

FIG. 1B shows a non-conductive support rail 65 and continuous conductive member 67. In addition, FIG. 1B shows a second conductive strip 69 (shown in end view at the end of the rail) positioned at the bottom of support rail 65. One or more conductive strips 69 might be used to conduct control signals, such as radio frequency control signals, down the length of the track. Conductive strip 69 would be a continuous, or minimum, joint strip in the same manner as conductive strip 67.

Figure 2A:
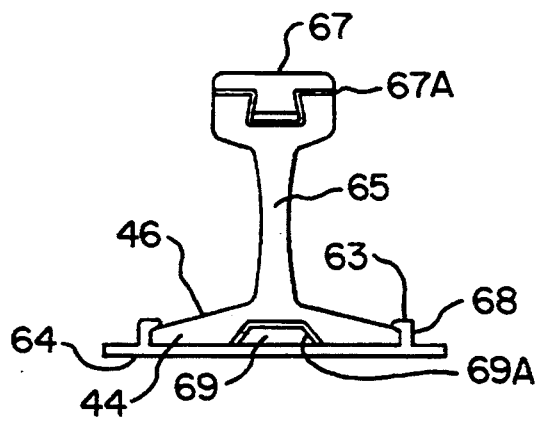
FIG. 2A shows a conductive support rail having insulating layers to insulate the support rail from the conductive top or surface rail.

An end view of support rail 65 with conductors 67 and 69 is shown in FIG. 2A. In addition, in FIG. 2A, the support rail 65 is made of a conductive metal, such as steel, brass, aluminum or tin. Insulating layers 67A and 69A are provided between the support rail 65 and conductors 67 and 69, respectively. Insulating layers 67A and 69A are preferably coatings of polycarbonate materials. Plastics such as vinyl or Teflon might be used.

Also shown in the end view in FIG. 2A, is a space between the bottom of conductor 67 and the bottom of the dovetail groove. This space is provided so that an electrical wire might be trapped in the space after passing through a hole (not shown) in the support rail. Thus, the conductor 67 can receive electrical power from a power source.

Figure 2B:
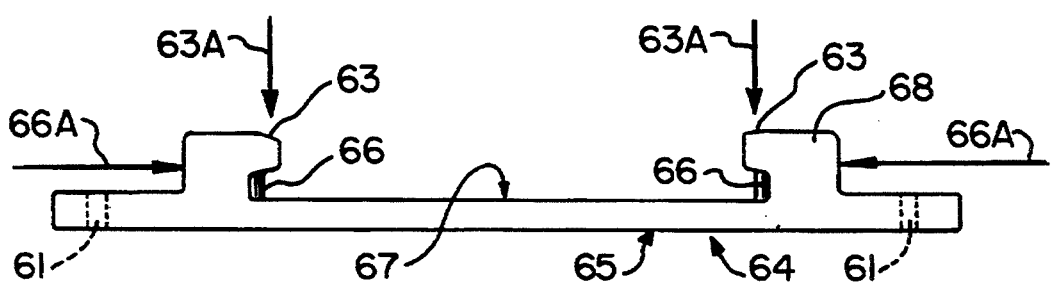
FIGS. 2B and 2C show a flexible rail clip for mounting a rail on ties or roadbed.
Figure 2C:
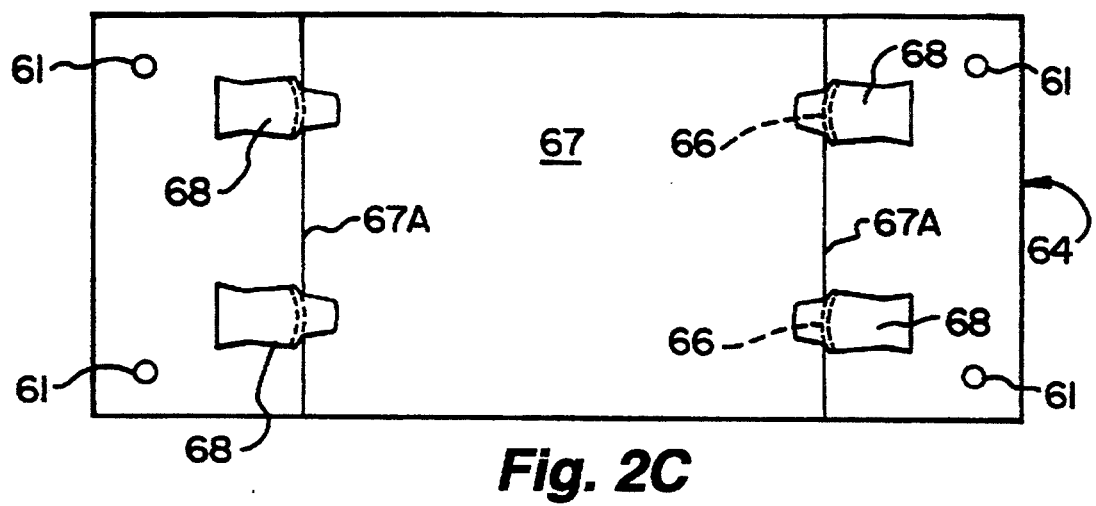

A snap in rail clip 64 is shown in FIGS. 2A, 2B and 2C. Clip 64 is precast, or molded, out of flexible polycarbonate materials, and has posts 68 with ears 63 that snap fit over the base 46 of support rail 44. The upper and inside surfaces of ears 63 act as camming surfaces relative to the edges of the foot of the rail. As the foot of the rail is pressed down on these camming surfaces, posts 68 flex apart, and the foot of the rail slips past ears 63 and snaps against base 67.

In the detail of FIG. 2B, the clip 64 has upstanding posts 68 molded as a single piece with base 65. Upstanding posts 68 have arcuate, vertical-fluted surfaces 66 and ears 63 to hold a rail firmly in place after it is snapped into clip 64. Fluted surfaces 66 would be shaped out of a harder material than the plastic clip and, for example, might be a metal insert, such as steel, brass, or aluminum, molded into the clip. Further, the rail base is held in a recessed area 67.

In FIG. 2C, there is a top view of clip 64 in FIG. 2B. Four posts 68 are shown. Arcuate fluted surfaces 66 are shown by dashed lines. The edges 67A of recess 67 are indicated. Also, holes 61 in base plate 65 are provided so that the clip 64 can be fastened to railroad ties, or roadbeds, with nails, spikes or bolts through the holes.

When a rail is pushed down into clip 64, base 65 and posts 68 flex to allow posts 68 to open sufficiently for the base of the rail to slip past ears 63. After ears 63 snap over the base of the rail, the rail is kept from moving vertically, and is held in recess 67 by ears 63 applying retentive forces in direction of arrows 63A. In addition, the rail is kept from slipping transverse to the direction of the rail by the edges of recess 67 and by retentive forces (in the direction of arrows 66A) from the inner arcuate surfaces 66 of posts 68. The rail is kept from slipping along the length of the rail by the vertical fluted surfaces 66.

Figure 3A:
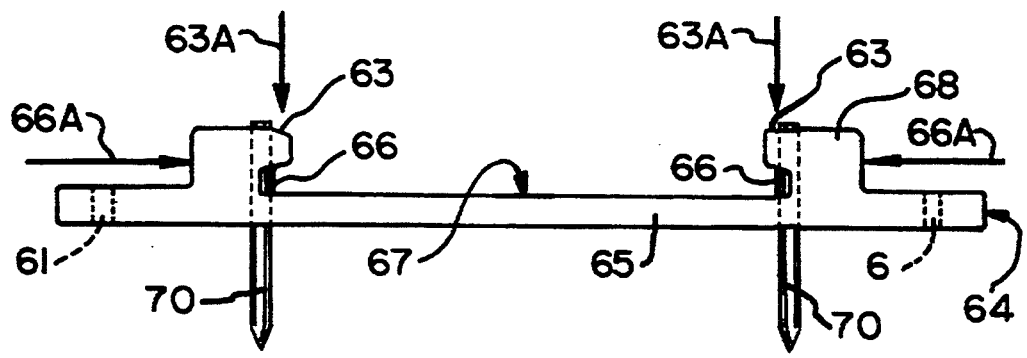
FIGS. 3A and 3B show one preferred embodiment of the tie plate with flexible posts and rigid pins.
Figure 3B:
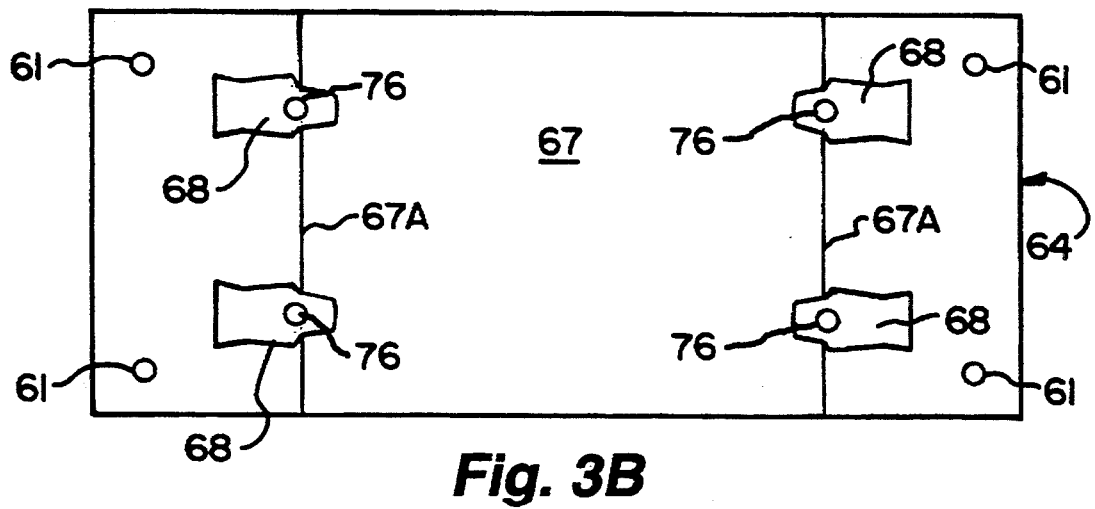

FIGS. 3A and 3B illustrate one preferred embodiment of the invention. In this embodiment, tie plate 64 is constructed the same as tie plate 64 in FIGS. 2B and 2C, except that, in this embodiment, the posts do not have molded rigid arcuate surfaces. As in FIGS. 2B and 2C, the base of the tie plate and/or the posts 68 are sufficiently flexible so that the foot of the rail may be pushed down between the posts 68. After the foot of the rail has snapped into place in recess 67 at the base 65 of the tie plate, pins 70 are driven down through holes 76 in posts 68. The pins are fluted to engage the edge of the foot of the rail as the pins are driven through the tie plate and into a tie or roadbed.

The posts 68 with flanges 63 provide retentive forces 63A and 66A, as described above for FIG. 2B. In addition, pins 70 grip the edge of the foot of the rail and provide rigidity to posts 68, and thereby strengthen the retentive forces of posts 68. The surface of pins 70 is textured, and preferably fluted, along the length of the pin so that when it is driven past the edge of the foot of the rail the edge is deformed by the pin. Thus, pins 70 grip the rail to prevent the rail from moving in a direction along the length of the rail. As before, the tie plate and posts would be constructed of flexible material, such as polycarbonates or plastics. Pins 70 would be fabricated from a more rigid material, such as steel, brass, aluminum, or alloys of same.

After the pins 70 have been driven through the tie plate to mount the rail on the roadbed, the pins may be fixed in place by applying an epoxy resin at the top of the pin to bond the pin to the post. A preferred epoxy cement is BIS-GMA resin which is cured by exposure to light.

Figure 4:
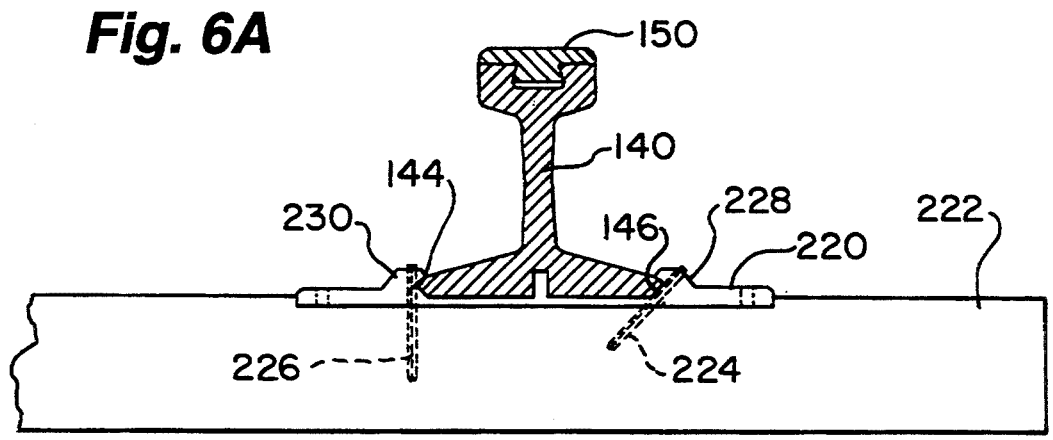
FIG. 4 shows a second preferred embodiment of the tie plate that slideably engages the foot of the rails which is pinned to the tie plate and a tie with fluted metal pins.

An alternative embodiment for tie plates to fasten the rails to the ties are shown in FIGS. 4–6. In this embodiment, the tie plates may be made of a more rigid material, such as ceramic, steel, alloys of metals, hard plastics or composites. The tie plates are designed with close tolerance dimensions relative to the dimensions of the foot of the rail. The dimensions of the tie plate and rail are such that the rail may slide into the rigid tie plate. The tie plate will then restrain vertical and lateral movement of the rail that has been inserted in the tie plate. To restrain longitudinal movement (i.e., further sliding of the rail within the tie plate) pins with a textured surface are driven through the tie plate to grip the edge of the foot of the rail, and to fasten the rail and tie plate to ties or roadbed. The pins are fabricated from rigid materials, such as steel, brass, aluminum or alloys or composites of same.

FIG. 4 shows an assembled composite rail in cross-section fastened in tie plate 220 on tie 222. Tie 222 is notched so that tie plate 220 is recessed in the notch in the tie. Fluted pins 224 and 226 pass through holes in tie plate 220, and holes in clamping shoes 228 and 230 and are driven into tie 222. Thus, pins 224 and 226 fasten the rail to the tie plate and the tie plate to the tie.

Pins 224 and 226 are fluted so as to engage the edge of the foot of the support rail 140 as the pins are driven into the tie. Pin 224 is oriented at 45° to the vertical and its flutes deform and engage 45° surface 146 at the edge of the foot of support rail 140. Pin 226 is oriented vertically, and its flutes deform and engage the vertical surface 144 at the edge of support rail foot. Since the pins engage the support rail foot, they tend to hold the support rail firmly against motion along the direction of the rail.

Figure 5B:
FIGS. 5A and 5B show a tie plate where the fluted pins are vertically oriented.
Figure 6B:
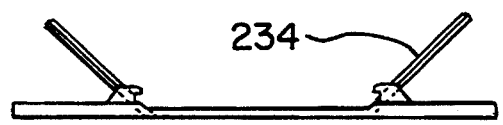
FIGS. 6A and 6B show a tie plate where the fluted pins are oriented at 45° from the vertical.
Figure 5A:
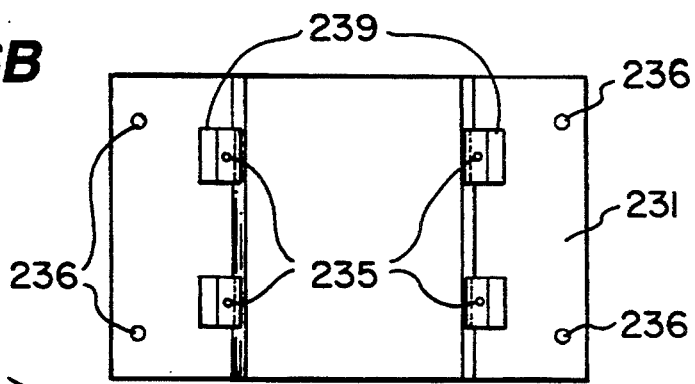
Figure 6A:
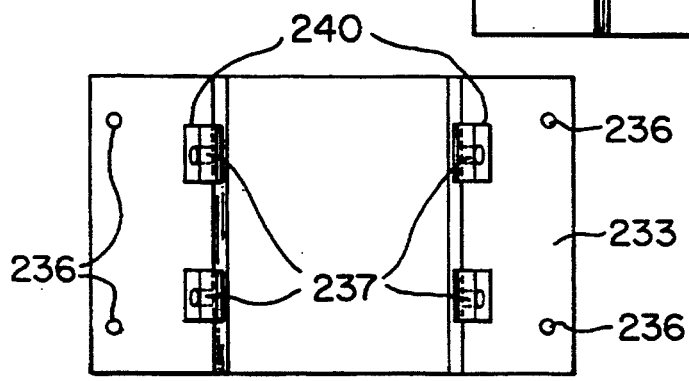

FIGS. 5A and 5B are top and side views of the tie plate with the holes for spikes oriented vertically. Spikes 232 are shown in FIG. 5B. FIGS. 6A and 6B are top and side views of the tie plate with the holes for spikes 234 oriented at 45° from the vertical. In both embodiments, the tie plates 231 and 233 are designed for use with a maximum of four spikes. In tie plate 231, holes 235 through the clamp shoes 239 and tie plate are oriented vertically. In tie plate 233, holes 237 through clamp shoes 240 and the tie plate are oriented 45° from vertical. In addition to the holes for spikes 232 and 234, each of the tie plates also has four holes 236 to receive spikes (not shown) for holding the tie plates alone to ties.

Vertical, or non-vertical, orientation of spike holes in the tie plates depends on the forces the rail will be subject to. Vertical orientation provides most resistance to vertical force from the rail. Non-vertical orientation provides more resistance to horizontal force from the rail, but less resistance to vertical force from the rail. Tie plate 220 in FIG. 4 uses a combination of vertical and non-vertical spike holes. One skilled in the art will appreciate that depending on the horizontal and vertical forces on the rail and the materials used for the rail, tie plates, and ties, other angular orientations of the spike holes may be selected.

Pins 224 may be affixed in place by applying an epoxy resin at the top of the pin to bond the pin to the post. A preferred epoxy cement is BIS-GMA resin which is cured by exposure to light.

While a number of preferred embodiments of the invention have been shown and described, it will be appreciated by one skilled in the art, that a number of further variations or modifications may be made without departing from the spirit and scope of my invention.

What is claimed is:

1. A tie plate for mounting a rail having a head and a foot on a railroad tie or roadbed, said tie plate comprising:
    a base plate;

at least two pairs of discrete posts molded in said base plate, said pairs of posts separated by the width of the foot of the rail to be mounted and one or more of said posts of each pair having a hole down through the post from top to bottom of the post to receive a pin;

said posts having flanges at the top of the posts, said flanges separated from the base plate by the height of the foot and extending over the foot of the rail for holding the rail in a restrained position against said base plate;

said posts are made of a material sufficiently flexible to allow the posts to flex and temporarily increase the separation of said flanges on posts on opposite sides of the rail so that the foot of the rail may be snapped into the restrained position;

pins inserted down through the holes in posts having such holes and into a railroad tie, or roadbed, after the foot of the rail is snapped into the restrained position, said pins engage the foot of the rail and the post to provide rigidity to said posts and fasten the rail and tie plate to the railroad tie, or roadbed, whereby a rail inserted into the restrained position and engaged by said pins will not slip in a direction along the length of the rail;

said flanges at the top of the posts apply a first retentive force on the foot of the rail to hold the rail in the restrained position against said base plate;

said pins in the posts apply a second retentive force on the foot of the rail to resist lateral motion of the rail; and each of said pins have a fluted surface for engaging a wall of the hole in the post and an edge of the foot.

2. The tie plate of claim 1 and in addition:

a recess molded into the base plate, said recess being the width of the foot of the rail and running in a direction along the length of the rail whereby a rail mounted in the restrained position in the recess is restrained against movement in a direction transverse to the direction of the rail.

3. The tie plate of claim 1 wherein the posts are molded of polycarbonate materials to provide flexibility to the posts during insertion of the foot of the rail.

4. The tie plate of claim 3 wherein the base plate is molded of polycarbonate materials whose flexibility assists in flexing the tie plate to separate the posts for insertion of the foot of the rail between the posts.

* * * * *